United States Patent
Yoo et al.

(10) Patent No.: US 12,406,978 B2
(45) Date of Patent: Sep. 2, 2025

(54) SECONDARY BATTERY AND METHOD FOR MANUFACTURING THE SAME

(71) Applicant: LG ENERGY SOLUTION, LTD., Seoul (KR)

(72) Inventors: Mi Jung Yoo, Daejeon (KR); Young Hoon Lee, Daejeon (KR); Min Jung Kim, Daejeon (KR); Woo Yong Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 594 days.

(21) Appl. No.: 17/686,576

(22) Filed: Mar. 4, 2022

(65) Prior Publication Data

US 2022/0190310 A1    Jun. 16, 2022

Related U.S. Application Data

(63) Continuation of application No. PCT/KR2020/011916, filed on Sep. 4, 2020.

(30) Foreign Application Priority Data

Sep. 5, 2019 (KR) .................. 10-2019-0110276
Sep. 3, 2020 (KR) .................. 10-2020-0112507

(51) Int. Cl.
  *H01M 4/04*    (2006.01)
  *H01M 50/107*  (2021.01)

(52) U.S. Cl.
  CPC ....... *H01M 4/0435* (2013.01); *H01M 4/0471* (2013.01); *H01M 50/107* (2021.01)

(58) Field of Classification Search
  CPC .................................................. H01M 50/107
  See application file for complete search history.

(56) References Cited

U.S. PATENT DOCUMENTS

2003/0017372 A1    1/2003 Probst et al.
2003/0017390 A1    1/2003 Probst et al.
(Continued)

FOREIGN PATENT DOCUMENTS

CN    203312377 U    11/2013
CN    108878986 A    11/2018
(Continued)

OTHER PUBLICATIONS

Machine translation of KR101879911B1 (Year: 2024).*
(Continued)

*Primary Examiner* — Brian R Ohara
*Assistant Examiner* — M. T. Leonard
(74) *Attorney, Agent, or Firm* — Birch, Stewart, Kolasch & Birch, LLP

(57) ABSTRACT

A method for manufacturing a secondary battery includes an electrode assembly preparation step of preparing an electrode assembly on which flat top and bottom surfaces are formed, a first pressing step of pressing the top and bottom surfaces of the electrode assembly by using a first pressing device, on which a curved surface is formed, to form a curved surface, which has a shape corresponding to that of the curved surface formed on the first pressing device, on each of the top and bottom surfaces of the electrode assembly, an accommodation step of accommodating the electrode assembly in a pouch type exterior in which a cup having a concave shape is formed, and a second pressing step of pressing the curved surfaces of the top and bottom surfaces of the electrode assembly and an outer surface of the pouch type exterior by using a second pressing device.

14 Claims, 15 Drawing Sheets

(56) References Cited

U.S. PATENT DOCUMENTS

| | | |
|---|---|---|
| 2006/0040178 A1 | 2/2006 | Probst et al. |
| 2011/0097815 A1 | 4/2011 | Goh et al. |
| 2013/0108907 A1* | 5/2013 | Bhardwaj .......... H01M 10/0431 |
| | | 29/623.2 |
| 2014/0090236 A1 | 4/2014 | Goh et al. |
| 2014/0093762 A1 | 4/2014 | Goh et al. |
| 2014/0234679 A1 | 8/2014 | Kim et al. |
| 2015/0113796 A1* | 4/2015 | Han ................. H01M 10/0436 |
| | | 29/623.1 |
| 2015/0228935 A1 | 8/2015 | Seong |
| 2016/0043355 A1 | 2/2016 | Byun et al. |
| 2016/0141711 A1 | 5/2016 | Jung |
| 2016/0380302 A1 | 12/2016 | Yun |
| 2018/0078442 A1 | 3/2018 | Choi et al. |
| 2019/0273263 A1 | 9/2019 | Shin et al. |
| 2019/0372062 A1 | 12/2019 | Kim et al. |

FOREIGN PATENT DOCUMENTS

| | | |
|---|---|---|
| EP | 2 770 555 A1 | 8/2014 |
| EP | 2 985 805 A1 | 2/2016 |
| JP | 8-260366 A | 10/1996 |
| JP | 2003-187759 A | 7/2003 |
| JP | 2012-145653 A | 8/2012 |
| JP | 2014-165170 A | 9/2014 |
| JP | 2016-39199 A | 3/2016 |
| KR | 2003-66168 A | 2/2003 |
| KR | 20040090597 A * | 10/2004 |
| KR | 10-2011-0073405 A | 6/2011 |
| KR | 10-2012-0024108 A | 3/2012 |
| KR | 10-1247466 B1 | 4/2013 |
| KR | 10-2014-0104888 A | 8/2014 |
| KR | 10-2015-0050319 A | 5/2015 |
| KR | 10-2015-0051498 A | 5/2015 |
| KR | 10-2016-0049456 A | 5/2015 |
| KR | 10-2015-0095464 A | 8/2015 |
| KR | 10-2016-0059780 A | 5/2016 |
| KR | 10-2016-0074209 A | 6/2016 |
| KR | 10-2016-0115357 A | 10/2016 |
| KR | 10-2017-0000368 A | 1/2017 |
| KR | 10-2017-0001358 A | 1/2017 |
| KR | 10-1816946 B1 | 1/2018 |
| KR | 10-2018-0056131 A | 5/2018 |
| KR | 10-2018-0062874 A | 6/2018 |
| KR | 10-1629852 B1 | 6/2018 |
| KR | 10-1879911 B1 | 7/2018 |
| KR | 10-2019-0031856 A | 3/2019 |
| WO | WO 01/82393 A2 | 11/2001 |
| WO | WO 2019/017668 A1 | 1/2019 |

OTHER PUBLICATIONS

Machine translation KR20040090597A (Year: 2024).*
Machine translation KR20180056131A (Year: 2024).*
Machine translation of KR101879911B1 claims (Year: 2024).*
Extended European Search Report for European Application No. 20861343.0, dated Jan. 19, 2023.
International Search Report (PCT/ISA/210) issued in PCT/KR2020/011916 mailed on Dec. 10, 2020.

* cited by examiner

SECONDARY BATTERY AND METHOD FOR MANUFACTURING THE SAME

CROSS-REFERENCE TO RELATED APPLICATION

The present application claims is a by-pass continuation of PCT International Application No. PCT/KR2020/011916, filed on Sep. 4, 2020, which claims the benefit of the priority of Korean Patent Application Nos. 10-2019-0110276, filed on Sep. 5, 2011, and 10-2020-0112507, filed on Sep. 3, 2020, which are hereby incorporated by reference in their entireties.

TECHNICAL FIELD

The present invention relates to a secondary battery and a method for manufacturing the same, and more particularly, to a secondary battery having a curvature radius less than that of a secondary battery according to a related art and a method for manufacturing the same.

BACKGROUND ART

As the demands for electronic devices and the consumer's demands for electronic devices become increasingly diverse, specifications required for secondary batteries that are mounted on the electronic devices and repeatedly chargeable and dischargeable are also diversified.

For example, recently, there is an increasing demand for virtual reality (VR) devices that is capable of being used by a user in a state of being mounted on a user's head. To allow the VR device to be mounted on the user's head, it is common for the VR device to have a curved surface having a shape corresponding to the shape of the human head. For this, the secondary battery is also required to have a curved shape beyond the existing shape. Alternatively, to maximize the utilization of the internal space of the electronic device, it is required that the shape of the secondary battery has an irregular shape such as the curved shape or the like deviating the existing regular shape.

To manufacture the secondary battery having the curved shape, it is generally necessary to press an outer surface of an electrode assembly by using a pressing press having a curved surface. However, according to the related art, there have been various problems in the process of pressing the outer surface of the electrode assembly by using the pressing press to form the curved surface.

For example, an electrode and a separator are in a state of being bonded to each other within the electrode assembly before being pressed by the pressing press. Thus, even if the electrode assembly is pressed by the pressing press to form the curved shape, the curved surface may not be maintained due to the bonding force between the electrode and the separator before being pressed by the pressing press, and thus, the curved surface may return to the state before being pressed. This problem tends to become worse as a radius of curvature of the curved surface formed by the pressing press decreases (i.e., as the electrode assembly is more bent by the pressing press).

Also, when a curved surface is formed by pressing the stacked type electrode assembly in which the electrode and the separator are alternately stacked, since a constituent for supporting the electrode assembly to maintain the curved shape of the stacked type electrode assembly is not provided, the electrode and the separator within the electrode assembly may be delaminated. This problem also tends to become worse as the radius of curvature of the curved surface formed by the pressing press decreases.

The above problems have been obstacles to manufacture an electrode assembly, on which a curved surface having a relatively small curvature radius is formed, and a secondary battery.

DISCLOSURE OF THE INVENTION

Technical Problem

Accordingly, an object of the present invention for solving the above problem is to manufacture an electrode assembly of which a curved surface is uniformly maintained in shape even though a time elapses because the curved surface having a curvature radius less than that of an electrode assembly according to a related art is formed.

Technical Solution

According to one aspect of the present invention for achieving the above object, a method for manufacturing a secondary battery comprises: an electrode assembly preparation step of preparing an electrode assembly which has a structure, in which electrodes and separators are alternately disposed, and on which flat top and bottom surfaces are formed; a first pressing step of pressing the top and bottom surfaces of the electrode assembly by using a first pressing device, on which a curved surface is formed, to form a curved surface, which has a shape corresponding to that of the curved surface formed on the first pressing device, on each of the top and bottom surfaces of the electrode assembly; an accommodation step of accommodating the electrode assembly, on which the curved surface is formed, in a pouch type exterior in which a cup having a concave shape is formed; and a second pressing step of pressing the curved surface, which is formed on the electrode assembly in the first pressing step, and an outer surface of the pouch type exterior by using a second pressing device on which a curved surface is formed.

The method may further comprise a cup formation step which is performed before the accommodation step and in which the cup, in which the curved surface having the shape corresponding to that of the curved surface formed on each of the top and bottom surfaces of the electrode assembly in the first pressing step is formed, is formed in the exterior.

The method may further comprise a surface leveling step which is performed after the second pressing step and in which the curved surface formed on the exterior, which is formed in the second pressing step, is leveled.

In the surface leveling step, a roller having a cylindrical shape may rotate on the curved surface formed on the exterior to improve evenness of the curved surface formed on the exterior.

The electrode assembly may have a lamination & stacking (L&S) structure in which the plurality of separate electrodes and the plurality of separate separators are alternately stacked in a thickness direction of the electrode assembly or a stacking & folding (S&F) structure in which a plurality of radical units comprising the electrodes are disposed on a rectangular separation film, and the separation film is folded.

In the electrode assembly preparation step, a pressure of pressing the electrode assembly may range of 180 kgf to 220 kgf, and a temperature of heating the electrode assembly may range of 40° C. to 70° C.

In the first pressing step, a pressure of pressing the electrode assembly may range of 600 kgf to 2,600 kgf, a temperature of heating the electrode assembly may range of 65° C. to 85° C., and a time taken to press and heat the electrode assembly may range of 20 seconds to 110 seconds.

In the first pressing step, a pressure of pressing the electrode assembly may range of 950 kgf to 3,000 kgf, and a time taken to press and heat the electrode assembly may range of 20 seconds to 65 seconds.

In the first pressing step, the pressure of pressing the electrode assembly may range of 900 kgf to 2,600 kgf, and the time taken to press and heat the electrode assembly may range of 20 seconds to 65 seconds.

In the second pressing step, a pressure of pressing the electrode assembly and the exterior may range of 200 kgf to 750 kgf, and a temperature of heating the electrode assembly and the exterior may range of 55° C. to 85° C.

The method may further comprise a third pressing step of additionally pressing the curved surface formed on the electrode assembly and the curved surface formed on the exterior, which are formed in the second pressing step, by using a third pressing device on which a curved surface is formed.

In the third pressing step, a pressure of pressing the electrode assembly and the exterior may range of 300 kgf to 700 kgf, a temperature of heating the electrode assembly and the exterior may range of 75° C. to 85° C., and a time taken to press and heat the electrode assembly and the exterior may range of 3 seconds to 12 seconds.

After the third pressing step, a curvature radius of the curved surface formed on each of the electrode assembly and the exterior may range of 70 mm to 150 mm, and more specifically, range of 80 mm to 100 mm.

According to another aspect of the present invention for achieving the above object, a secondary battery comprises: an electrode assembly which has a structure in which electrodes and separators are alternately disposed and on which a curved surface is formed on each of top and bottom surfaces thereof; and a pouch type exterior which accommodates the electrode assembly and on which a curved surface having a curvature radius corresponding to a curvature radius of the curved surface formed on each of the top and bottom surfaces of the electrode assembly is formed, wherein a cup having a concave shape is formed in the pouch type exterior, wherein each of the curved surface formed on the electrode assembly and the curved surface formed on the exterior has a curvature radius of 70 mm to 150 mm.

Advantageous Effects

According to the present invention, the electrode assembly that is uniformly maintained in shape even though the time elapses because the curved surface having the curvature radius less than that of the electrode assembly according to the related art is formed.

FIG. is a graph illustrating results of Experimental Example 2 according to Embodiments 1 and 5 of the present invention.

Figure 12:
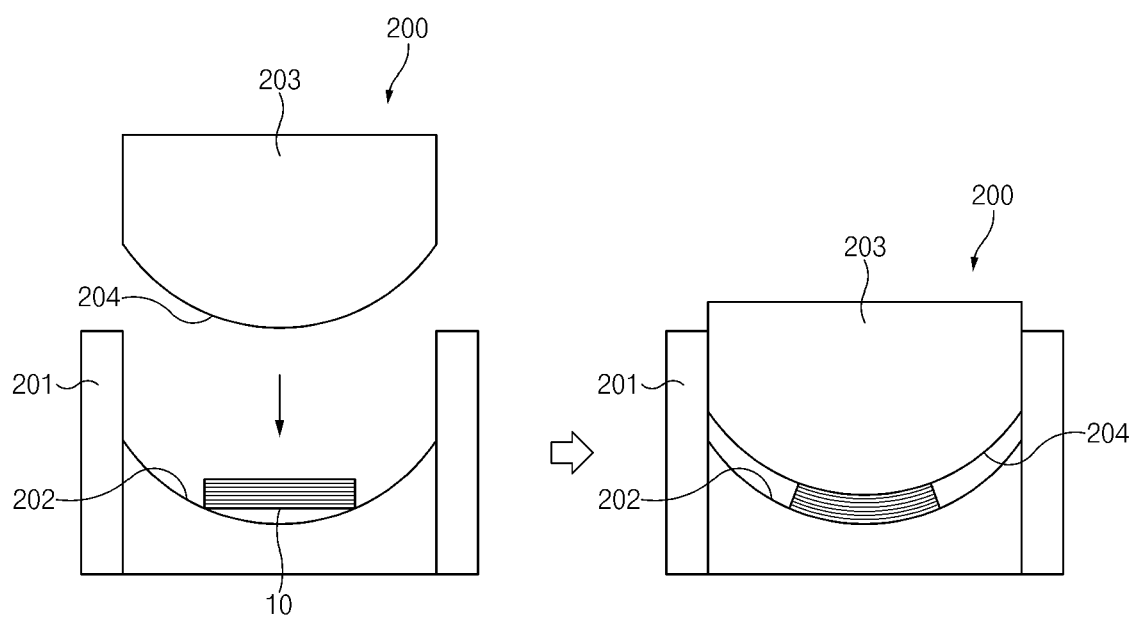

FIG. 12 is a drawing which illustrates forming a curved surface by pressing an electrode assembly by using the first pressing device.

Figure 13:
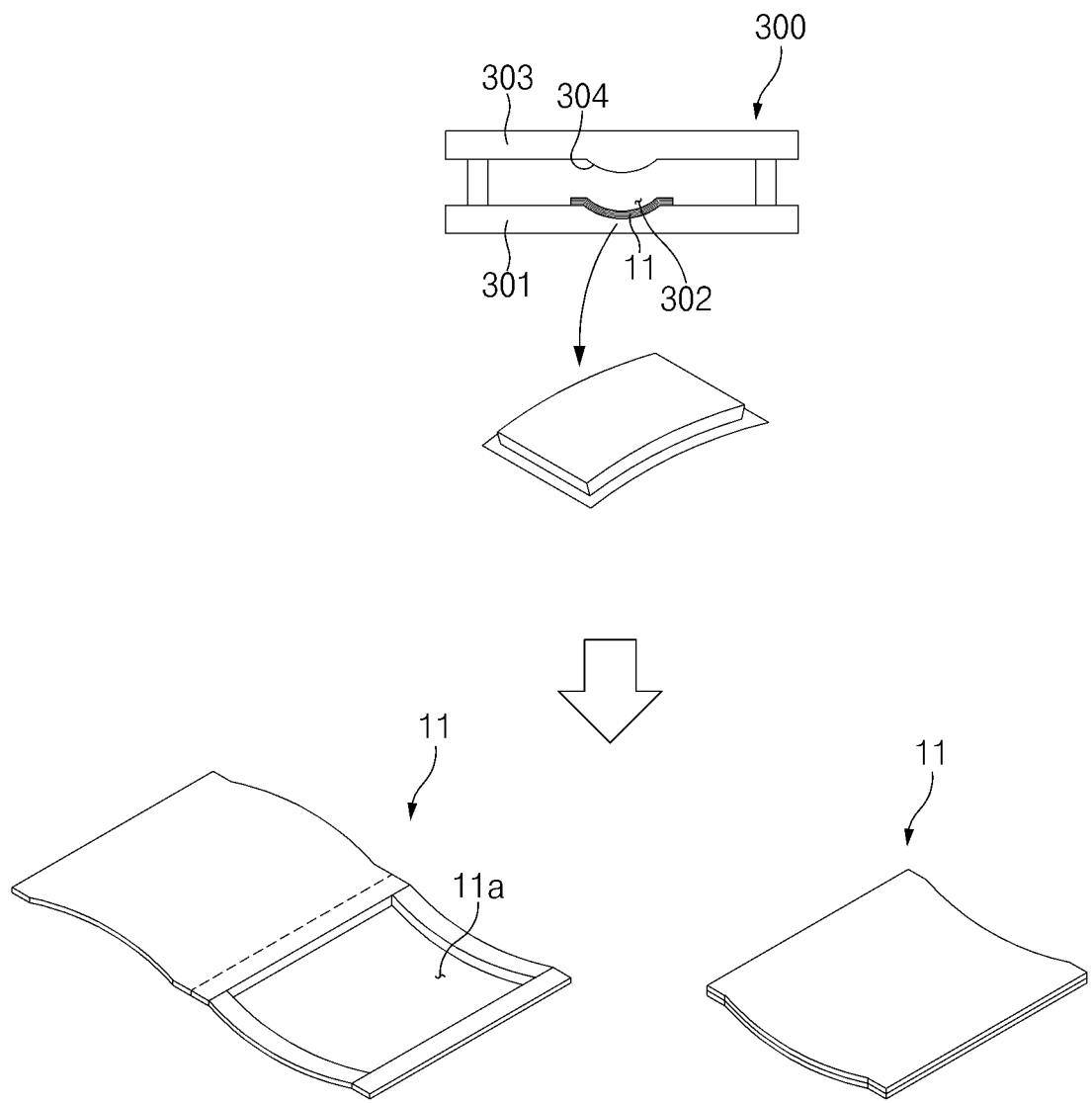

FIG. 13 is a drawing which illustrates forming a curved surface in a pouch type exterior provided with a cup using a molding device.

Figure 14:
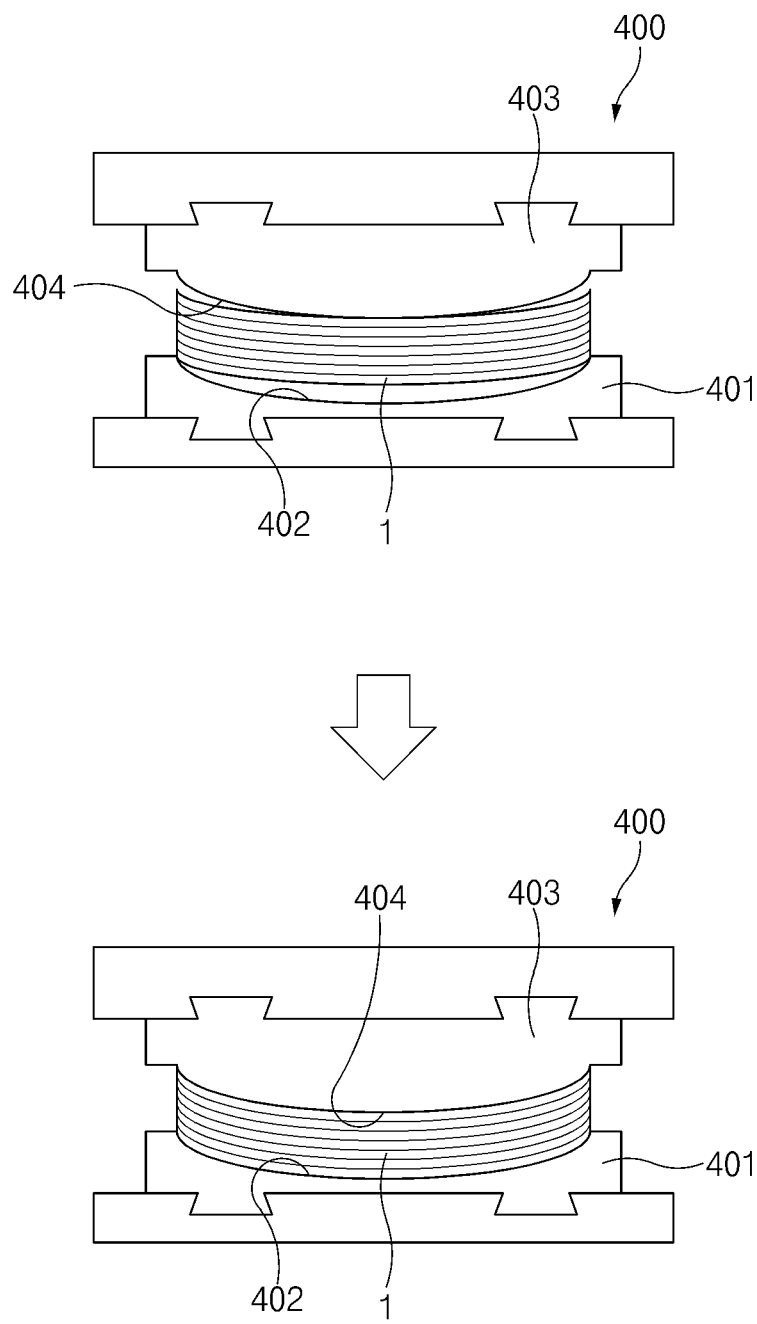

FIG. 14 is a drawing which illustrates pressing a secondary battery in which an electrode assembly is received in the pouch type exterior by using the second pressing device.

Figure 15:
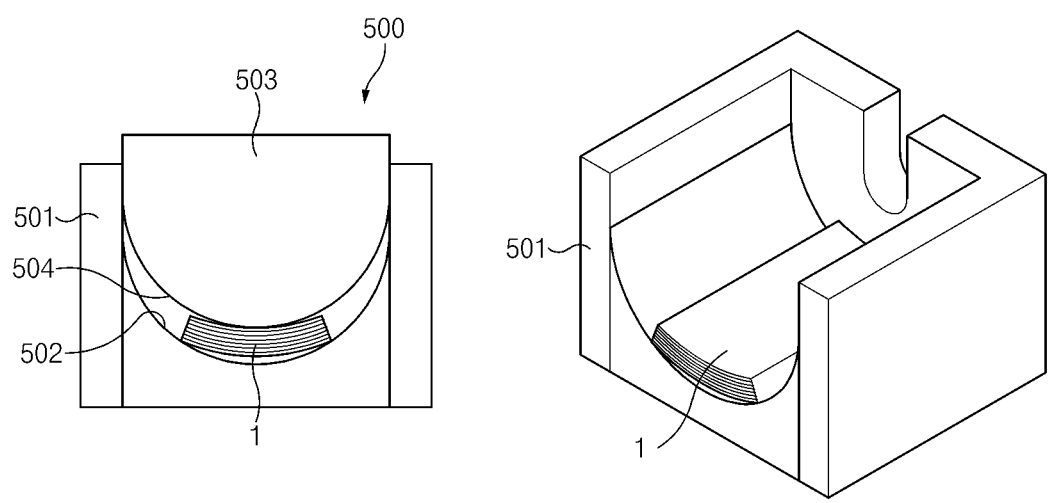

FIG. 15 is a drawing which illustrates pressing a secondary battery in which an electrode assembly is received in the pouch type exterior by using the third pressing device.

MODE FOR CARRYING OUT THE INVENTION

Hereinafter, a secondary battery and a method of manufacturing the secondary battery according to an embodiment of the present invention will be described with reference to the drawings.

Secondary Battery

Figure 1:
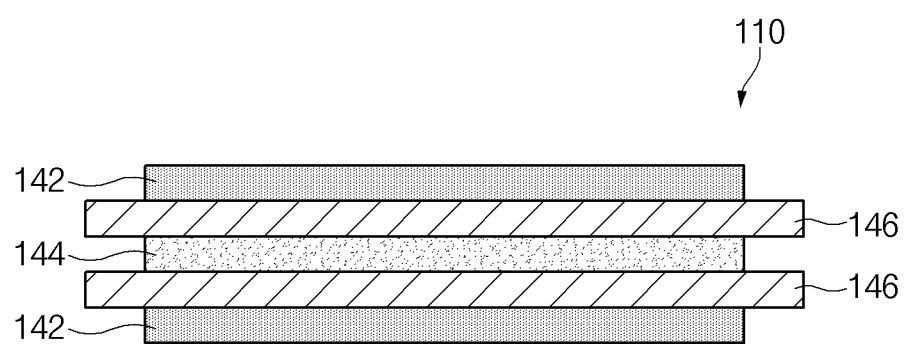
FIG. 1 is a cross-sectional view illustrating a structure of a first radical unit of a secondary battery according to the present invention.
Figure 2:
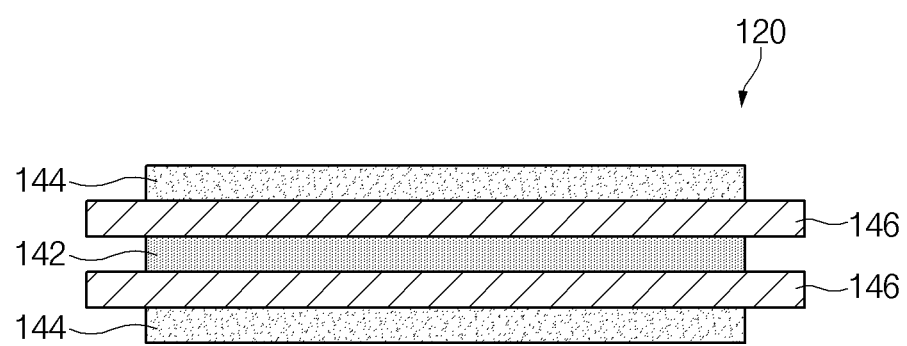
FIG. 2 is a cross-sectional view illustrating a structure of a second radical unit of the secondary battery according to the present invention.
Figure 3:
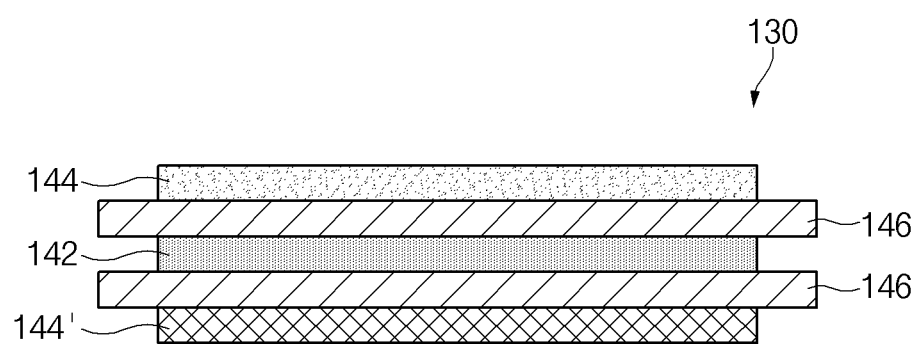
FIG. 3 is a cross-sectional view illustrating a structure of a third radical unit of the secondary battery according to the present invention.

FIG. 1 is a cross-sectional view illustrating a structure of a first radical unit of a secondary battery according to the present invention, and FIG. 2 is a cross sectional view illustrating a structure of a second radical unit of the secondary battery according to the present invention. Also, FIG. 3 is a cross-sectional view illustrating a structure of a third radical unit of the secondary battery according to the present invention.

A secondary battery according to the present invention may comprise a first radical unit 110, a second radical unit 120, and a third radical unit 130, each of which comprises an electrode and a separator. Each of the first to third radical units 110, 120, and 130 may have a structure in which a negative electrode 142, a separator 146, and positive electrodes 144 and 144' are alternately disposed. In more detail, each of the first to third radical units may have a structure in which a negative electrode, a separator, and a positive electrode are alternately stacked.

As illustrated in FIG. 1, the first radical unit 110 may have a five-layered structure in which the negative electrode 142, the separator 146, the positive electrode 144, the separator 146, and the negative electrode 142 are alternately stacked.

Also, as illustrated in FIG. 2, the second radical unit 120 may have a five-layered structure in which the positive electrode 144, the separator 146, the negative electrode 142, the separator 146, and the positive electrode 144 are alternatively disposed upward from a lower side.

Similar to the case of the second radical unit 120, the third radical unit 130 may have a five-layered structure in which the positive electrode, the separator, the negative electrode, the separator, and the positive electrode are alternatively disposed upward from the lower side. However, as illustrated in FIG. 3, one of the positive electrodes disposed on both ends of the third radical unit 130 may be a single-sided positive electrode 144'.

In general, the electrode may have a structure in which an electrode active material layer is applied on both surfaces of an electrode sheet. However, the single-sided positive electrode according to the present invention has a structure in which a positive electrode active material layer is applied to only one surface of the positive electrode sheet. Here, a surface of both the surfaces of the positive electrode sheet of the single-sided positive electrode 144', on which the positive electrode active material layer is applied, may be in contact with the separator 146.

Figure 4:
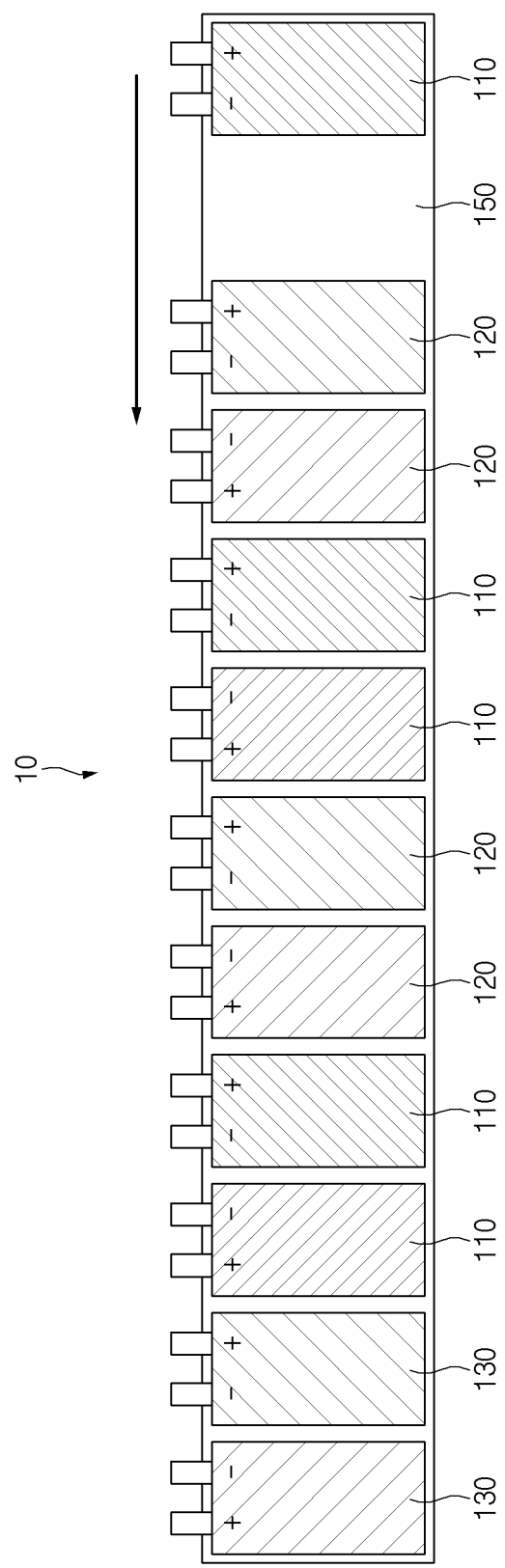
FIG. 4 is a plan view illustrating a state in which an electrode assembly of the secondary battery is unfolded according to an embodiment of the present invention.

As illustrated in FIG. 4, an electrode assembly 10 according to an embodiment of the present invention may comprise a separation film 150 and the first to third radical units 110, 120, and 130, which are disposed on the separation film 150. As illustrated in FIG. 4, the first to third radical units 110, 120, and 130 may have the same width.

As illustrated in FIG. 4, when the electrode assembly 10 is unfolded, the first radical unit 110 may be disposed on one end of the separation film 150, and an empty space may be formed by the width of each of the first to third radical units in a direction of the other end of the separation film 150, which is opposite to the one end. Then, the two second radical units 120, the two first radical units 110, the two second radical units 120, the two first radical units 110, and the two third radical units 130 may be sequentially disposed. The single-sided positive electrode of the two third radical units 130 may be disposed to contact the separation film 150 (see FIG. 5).

Figure 5:
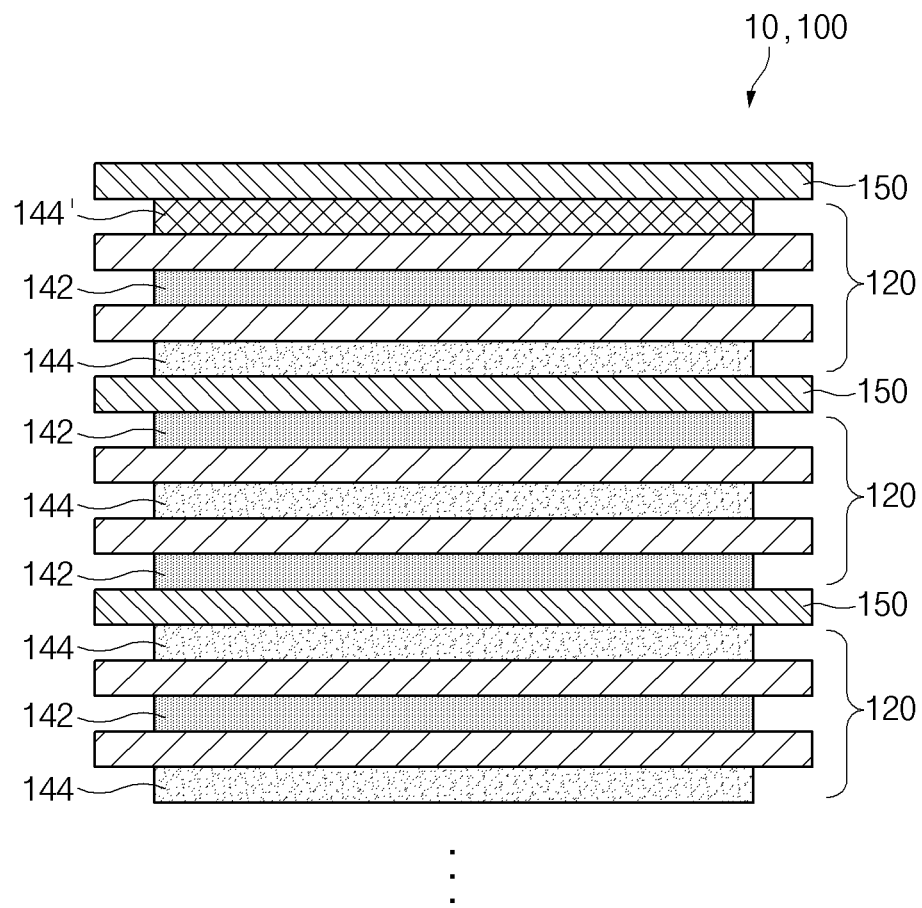
FIG. 5 is a cross-sectional view illustrating a structure of the electrode assembly of the secondary battery according to an embodiment of the present invention.

As illustrated in FIG. 5, the electrode assembly 10 according to an embodiment of the present invention may have a structure in which the first to third radical units 110, 120, and 130 are disposed on the separation film 150, and then, the separation film 150 is folded. Hereinafter, in this specification, the above-described structure, in which the plurality of radical units comprising the electrodes are disposed on the separation film, and then, the separation film is folded, will be referred to as a stacking & folding structure.

The secondary battery according to the present invention may comprise an electrode assembly having a structure, in which the electrodes and the separators are alternately disposed and on which a curved surface is formed on each of top and bottom surfaces, and a pouch type exterior which accommodates the electrode assembly, on which a curved surface having a curvature radius corresponding to that of the curved surface formed on each of the top and bottom surfaces of the electrode assembly is formed, and which comprises a cup having a concave shape. Here, the curvature radius of each of the curved surfaces formed on the electrode assembly and the exterior may range of 70 mm to 150 mm.

That is, the curvature radius of the curved surface of the secondary battery according to the present invention may range of 70 mm to 150 mm.

For reference, the curvature radius of the secondary battery may be set in the range of 70 mm to 150 mm so as to be mounted on a head of the human, but if it is a secondary battery mounted on a VR device that is suitable for a general adult's head, the curvature radius of the secondary battery may be set to the range of 80 mm to 100 mm. Also, the secondary battery having the curvature radius of 70 mm may be mounted on a small-sized VR device that is worn by children or people having small heads, and the secondary battery having the curvature radius of 150 mm may be mounted on a large-sized VR device that is worn by people having a large head.

Method for Manufacturing Secondary Battery

A method for manufacturing a secondary battery according to the present invention may comprise an electrode assembly preparation step of preparing an electrode assembly having a structure in which electrodes and separators are alternately disposed. Here, a flat surface may be formed on each of top and bottom surfaces of the electrode assembly that is prepared in the electrode assembly preparation step.

Here, the electrode assembly prepared in the electrode assembly preparation step may comprise an electrode stack having (i) a lamination & stacking (L&S) structure which a plurality of separate electrodes and a plurality of separate separators are alternately stacked in a thickness direction of the electrode assembly or (ii) a stacking & folding (S&F) structure in which a plurality of radical units comprising electrodes are disposed on rectangular separation film, and the separation film is folded.

Also, in the electrode assembly preparation step, a pressure of pressing the radical unit to manufacture the radical unit may range of 180 kgf to 220 kgf, and a temperature of heating the radical unit may range of 40° C. to 70° C.

In the case in which the electrode assembly prepared in the electrode assembly preparation step according to the present invention comprises the electrode stack having the S&F structure, in the electrode stack, when the radical unit is disposed on the separation film, and then, the separation film is folded, a pressure of pressing the separation film and the radical unit may range of 140 kgf to 160 kgf, and a heating temperature may range of 65° C. to 75'C.

The method for manufacturing the secondary battery according to the present invention may be performed for manufacturing a secondary battery having a curved surface having a relatively small curvature radius when compared to the secondary battery according to the related art. The curvature radius of the curved surface formed on the secondary battery manufactured by the method for manufacturing the secondary battery according to the present invention may range of 70 mm to 150 mm, and more specifically, range of 80 mm to 100 mm.

The method for manufacturing the secondary battery according to the present invention may comprise a first pressing step of pressing top and bottom surfaces of the electrode assembly by using first pressing device, on which a curved surface is formed, to form a curved surface, which has a shape corresponding to that of the curved surface formed on the first pressing device, on each of the top and bottom surfaces of the electrode assembly. In the method for manufacturing the secondary battery according to the present invention, since the curved surface is initially formed on each of the top and bottom surfaces of the electrode assembly, the first pressing step according to the present invention may be referred to as a curving process. Referring to FIG. 12, the above first pressing device 200 comprises a lower die 201 of which the inside surface 202 is in a concave shape and an upper die 203 having a convex surface 204. Therefore, in the first pressing step, the above electrode assembly 10 can have the shape which corresponds to the curved surface formed on the first pressing device as the upper die 203 presses by moving downward so that the convex surface 204 can be close to the concave surface 202 in a state where the electrode assembly 10 is placed inside the above lower die 201.

In the first pressing step of the method for manufacturing the secondary battery according to the present invention, a pressure of pressing the top and bottom surfaces of the electrode assembly may range of 600 kgf to 2,600 kgf, a temperature of heating the top and bottom surfaces of the electrode assembly may range of 65° C. to 85° C., and a time taken to press and heat the electrode assembly may range of 20 seconds to 110 seconds.

When the pressure of pressing the top and bottom surfaces of the electrode assembly in the first pressing step is 600 kgf or less, the curved surface having the curvature radius within the range to be manufactured by the present invention may not be formed on the secondary battery. On the other hand, when the pressure of pressing the top and bottom surfaces of the electrode assembly in the first pressing step exceeds 2,600 kgf, air permeability may be too large.

The air permeability may refer to a time taken to allow air to pass through a certain component (e.g., the electrode assembly). Thus, the permeability of the electrode assembly may be measured to confirm ion permeability. Thus, that the air permeability of the electrode assembly is high may mean that it takes a long time to pass through the separator, i.e., that the ion permeability of the electrode assembly is low. As a result, when the air permeability of the electrode assembly is too large, performance of the electrode assembly or the secondary battery may be deteriorated.

More preferably, a temperature of heating the top and bottom surfaces of the electrode assembly in the first pressing step may range of 950 kgf to 3,000 kgf. Alternatively, more preferably, a temperature of heating the top and bottom surfaces of the electrode assembly in the first pressing step may range of 900 kgf to 1,000 kgf. Also, more preferably, a time taken to pressing the top and bottom surfaces of the electrode assembly in the first pressing step may range of 20 seconds to 65 seconds. Alternatively, more preferably, a time taken to pressing the top and bottom surfaces of the electrode assembly in the first pressing step may range of 95 seconds to 105 seconds.

The method of manufacturing the secondary battery according to the present invention may further comprise an accommodation step of accommodating the electrode assembly having the curved surface in a pouch type exterior (hereinafter, referred to as an "exterior") in which a cup having a concave shape is formed. Here, the shape of the cup formed in the exterior may correspond to that of the electrode assembly on which the curved surface is formed by the first pressing step. Referring to FIG. 13, an exterior 11 which receives the electrode assembly 10 also may be prepared so that a dipped portion 11a such as a cup can be formed through the molding device 300 which comprises the lower die 301 in which the concave space 302 is provided and the upper die 303 having the convex side 304. Here, depending on the method of adding the exterior 11, the above dipped portion 11a may be formed on either both sides or one side, and the exterior 11 can be prepared to have the curved surface so as to fit into the curved surface of the electrode assembly 10 received inside the exterior 11.

Also, in order to form the cut in the exterior, the method for manufacturing the secondary battery according to the present invention may further comprise a cup formation step of forming a cup having a curved surface, which has a shape corresponding to that of the curved surface formed on each of the top and bottom surface of the electrode assembly in the first pressing step, in the exterior. Here, the cup formation step is performed before the accommodation step.

The method for manufacturing the secondary battery according to the present invention may further comprise a second pressing step of pressing the curved surface, which is formed on the electrode assembly in the first pressing step, and an outer surface of the exterior by using a second pressing device. That is, the second pressing step may be a step of pressing the curved surface formed on the secondary battery.

The second pressing step may be performed after the accommodation step. That is, in the second pressing step, the electrode assembly may be accommodated in the cup formed in the exterior, and then, the outer surface of the exterior may be pressed to also press the curved surface formed on the electrode assembly accommodated in the exterior. Accordingly, according to the present invention, the shape of the curved surface of the electrode assembly formed in the first pressing step may be more firmly maintained by the second pressing step. Referring to FIG. 14, the second pressing device 400 provided in the second pressing step also comprises the lower die 401 having the inside surface 402 of a concave shape and the upper die 403 having the convex surface 404 similar to the first pressing device 200 described above. Therefore, the upper die 403 may press so that the above secondary battery 1 may be more bent in a state in which the secondary battery 1 is placed inside the above lower die 401.

In the second pressing step, a pressure of pressing the electrode assembly and the exterior (i.e., the secondary battery) may range of 200 kgf to 750 kgf, and a temperature of heating the top and bottom surfaces of the secondary battery may range 55° C. to 85° C.

Figure 6:
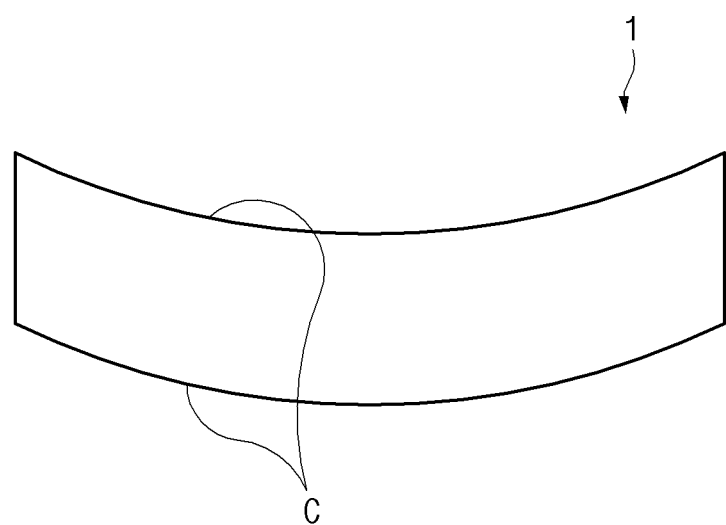
FIG. 6 is a side view illustrating a state in which a curved surface is formed on the secondary battery after a second pressing step in a method for manufacturing the secondary battery according to the present invention.

The second pressing step may be performed by pressing the exterior, in which the electrode assembly is accommodated, through a first jig and a second jig after inserting the exterior, in which the electrode assembly is accommodated, between the first jig and the second jig, each of which has a curved surface. Therefore, the second pressing step may also be referred to as a jig formation process. FIG. 6 is a side view illustrating a state in which the curved surface is formed on the secondary battery after the second pressing step in the method for manufacturing the secondary battery according to the present invention, i.e., illustrates a case in which a curved surface C is formed on each of the top and bottom surfaces of the secondary battery 1 after the first pressing step.

Figure 7:
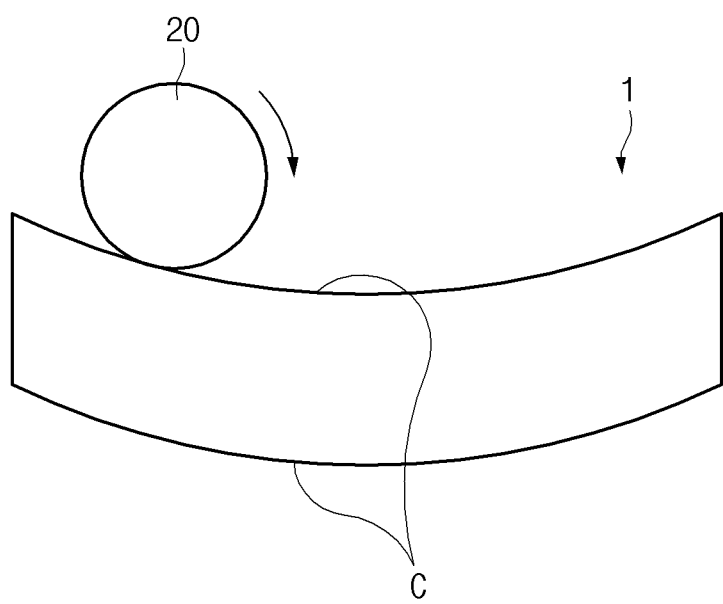
FIG. 7 is a side view illustrating a state in which a surface leveling step is performed in the method for manufacturing the secondary battery according to an embodiment of the present invention.

The method for manufacturing the secondary battery according to the present invention may further comprise a surface leveling step of leveling the curved surface formed on the exterior, which is formed in the second pressing step. Here, the surface leveling step may be performed after the second pressing step. FIG. 7 is a side views illustrating a state in which the surface leveling step is performed in the method for manufacturing the secondary battery according to an embodiment of the present invention. FIG. 7 illustrates a state in which a roller 20 having a cylindrical shape rotates on the curved surface C formed on the top surface of the secondary battery 1.

In the surface leveling step, the roller 20 having the cylindrical shape may rotate on the curved surface C formed on the secondary battery 1 to improve the evenness of the curved surface formed on the secondary battery 1. More preferably, in the surface leveling step, when the roller 20 rotates on the curved surface formed on the secondary battery 1, the roller 20 having the cylindrical shape may not be slid on the curved surface C formed on the secondary battery 1. This may be understood as force of static friction acting between the roller and the curved surface formed on the secondary battery in the surface leveling step.

Also, the method for manufacturing the secondary battery according to the present invention may further comprise a third pressing step of additionally pressing the curved surface formed on the electrode assembly and the curved surface formed on the exterior by using a third pressing device. That is, the third pressing step may be a step of pressing the curved surface formed on the secondary battery. The third pressing step may be performed after the surface leveling step. Referring to FIG. 15, the third pressing device 500 provided in the third pressing step also comprises the lower die 501 of which the inside surface 502 is in a concave shape and the upper die 503 having the convex surface 504 similar to the first pressing device 200 and the second pressing device 400 as described above. Therefore, the upper die 503 may press so that the above secondary battery 1 may be more bent in a state in which the secondary battery 1 is placed inside the above lower die 501.

As described above, the evenness of the curved surface formed on the exterior in the surface leveling step may be improved. However, in this process, since the roller having the cylindrical shape presses the curved surface formed on the secondary battery, deformation may occur in the curvature radius of the curved surface formed on the secondary battery.

Accordingly, according to the present invention, since the curved surface formed on the secondary battery is additionally pressed in the third pressing step after the surface leveling step, the shape of the curved surface of the secondary battery, which is formed in the first pressing step and the second pressing step, may be more firmly maintained by the third pressing step.

In the third pressing step, a pressure of pressing the top and bottom surfaces of the electrode assembly and the exterior (i.e., the secondary battery) may range of 300 kgf to 700 kgf, a temperature of heating the top and bottom surfaces of the secondary battery may range of 75° C. to 85° C., and a time taken to press and heat the top and bottom surfaces of the secondary battery may range of 3 seconds to 12 seconds.

The third pressing step may be performed by heating and pressing the secondary battery through a hot press jig after inserting the secondary battery inside the hot press jig that is heated at a high temperature. Therefore, the third pressing step may be referred to as a hot press process. The curvature radius of the secondary battery after the third pressing step, i.e., the hot press process, may range of 70 mm to 150 mm.

According to the present invention, in the first pressing device for pressing the top and bottom surfaces of the electrode assembly in the first pressing step, a curved surface of an area for pressing an intermediate area of the electrode assembly and a curved surface of an area for pressing each of both ends of the electrode assembly may have curvature radii different from each other. In more detail, in the first pressing device, the curvature radius of the curved surface of the area for pressing each of both the ends of the electrode assembly may be less than the curvature radius of the curved surface of the area for pressing the intermediate area of the electrode assembly.

The electrode assembly on which the curved surface is formed by the pressing device may tend to be unfolded again as a time elapses. This is due to restoring force generated by adhesion between the electrode and the separator within the electrode assembly. This tendency is relatively large at an end of the curved surface formed on the electrode assembly.

In the first pressing device, the reason in which the curved surfaces of the areas for pressing each of both the ends and the intermediate area have curvature radii different from each other is for offsetting the above-described tendency. That is, in the first pressing step, the curved surface, which is formed on each of both the ends, of the curved surface formed on the electrode assembly may have a relatively small curvature radius to reduce a deviation of the curvature radius on an entire area of the curved surface.

Embodiment 1

A separation film, five first radical units, four second radical units, and two third radical units were prepared. The first radical unit has a structure in which a negative electrode, a separator, a positive electrode, a separator, and a negative electrode are sequentially stacked, the second radical unit has a structure in which a positive electrode, a separator, a negative electrode, a separator, and a positive electrode are sequentially stacked, and the third radical unit has a structure in which a single-sided positive electrode, a separator, a negative electrode, a separator, and a positive electrode are sequentially stacked.

In a process of manufacturing the first to third radical units, a pressure applied to the electrode and the separator to allow the electrode and the separator to adhere to each other was 200 kgf, and a temperature of heating the electrode and the separator was 50° C.

Thereafter, the first to third radical units were disposed on a top surface of the separation film. The first radical unit was disposed on one end of the separation film, and an empty space was formed by a width of each of the first to third radical units in a direction of the other end of the separation film. Then, two second radical units, two first radical units, two second radical units, two first radical units, and two third radical units were sequentially disposed. Here, single-sided positive electrodes of the two third radical units were disposed to contact the separation film.

After the separation film is disposed as described above, the separation film was folded to manufacture an electrode assembly.

Thereafter, the electrode assembly was pressed using a first pressing device, on which a curved surface is formed, to form a curved surface on the electrode assembly (first pressing step). When the first pressing device presses the electrode assembly, a pressing temperature was 80° C., a pressing pressure was 600 kgf, a pressing time was 60 seconds.

Thereafter, the electrode assembly, was accommodated in a sheet type exterior in which a cup having a shape corresponding to that of the electrode assembly, on which the curved surface is formed by the first pressing device, is formed to manufacture a secondary battery.

Thereafter, the curved surface formed on the secondary battery was additionally pressed using a second pressing deice on which a curved surface is formed (jig formation process). When the second pressing device presses the secondary battery, a pressing temperature was 60° C., and a pressing pressure was 300 kgf.

Thereafter, the curved surface formed on the secondary battery was additionally pressed using a third pressing deice on which a curved surface is formed (hot press process). When the third pressing device presses the secondary battery, a pressing temperature was 80° C., a pressing pressure was 350 kgf, a pressing time was 10 seconds.

Embodiment 2

A secondary battery was manufactured in the same manner as in Embodiment 1, except that a pressing pressure when a first pressing device presses an electrode assembly is 900 kgf.

Embodiment 3

A secondary battery was manufactured in the same manner as in Embodiment 1, except that a pressing pressure when a first pressing device presses an electrode assembly is 1,000 kgf.

Embodiment 4

A secondary battery was manufactured in the same manner as in Embodiment 1, except that a pressing pressure when a first pressing device presses an electrode assembly is 1,500 kgf.

Embodiment 5

A secondary battery was manufactured in the same manner as in Embodiment 1, except that a pressing time when a first pressing device presses an electrode assembly is 100 seconds.

Experimental Example 1

A curvature radius of the curved surface formed on each of the secondary batteries manufactured according to Embodiments 1 to 5 was measured. After photographing an image of the secondary battery by using a 3D measuring device from Keyence, three points of both end points and a middle point of the secondary battery was set to be measured. Then, a curvature radius was measured based on the three points.

Figure 8:
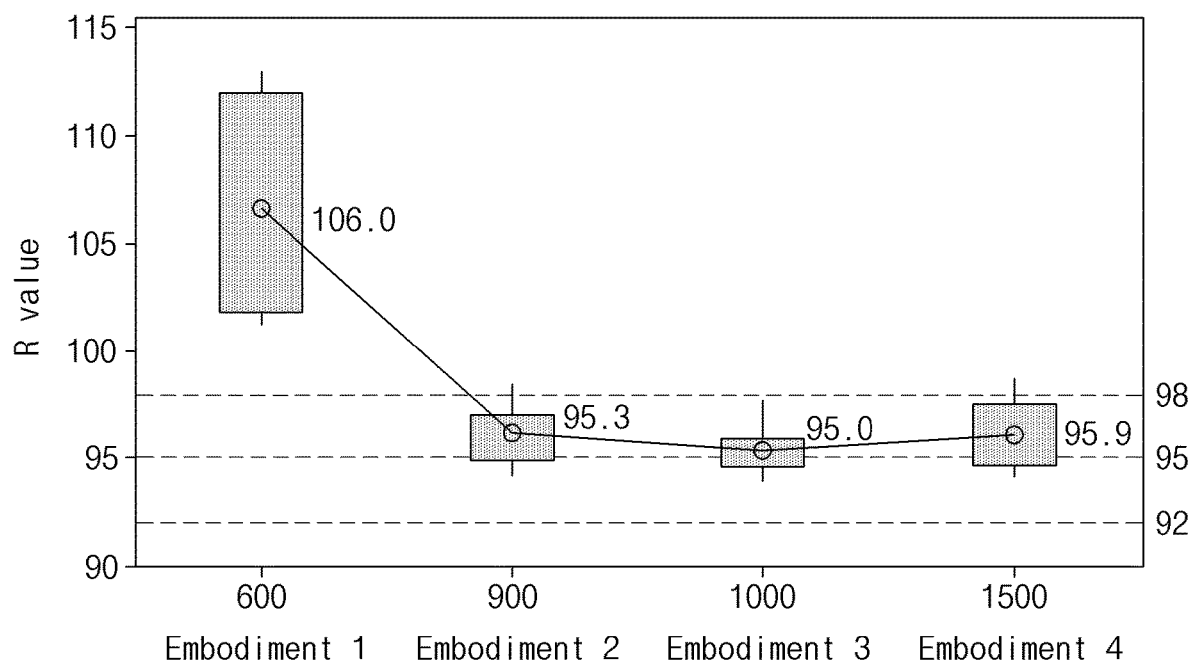
FIG. 8 is a graph illustrating results of Experimental Example 1 according to Embodiments 1 to 4 of the present invention.
Figure 9:
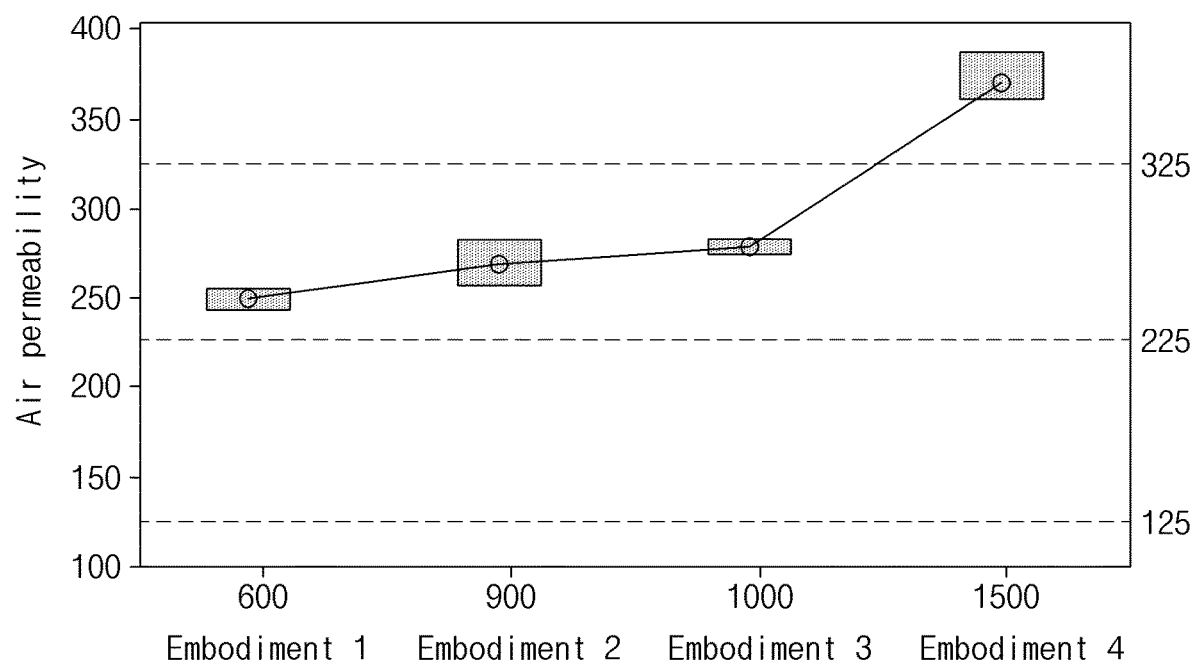
FIG. 9 is a graph illustrating results of Experimental Example 2 according to Embodiments 1 to 4 of the present invention.

The results obtained by measuring the curvature radius of the curved surface formed on each of the secondary batteries manufactured according to Embodiments 1 to 4 were illustrated in FIG. 8, and the results obtained by measuring the curvature radius of the curved surface formed on each of the secondary batteries manufactured according to Embodiments 1 and 5 were illustrated in FIG. 9.

Experimental Example 2

Figure 10:
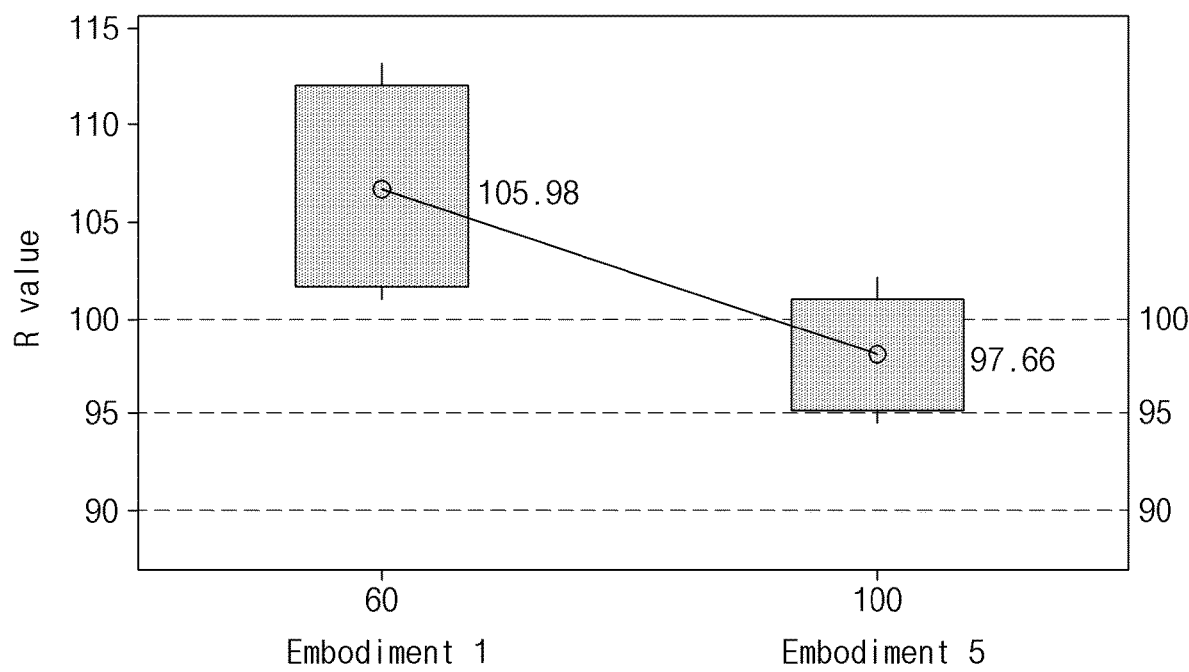
FIG. 10 is a graph illustrating results of Experimental Example 1 according to Embodiments 1 and 5 of the present invention.
Figure 11:
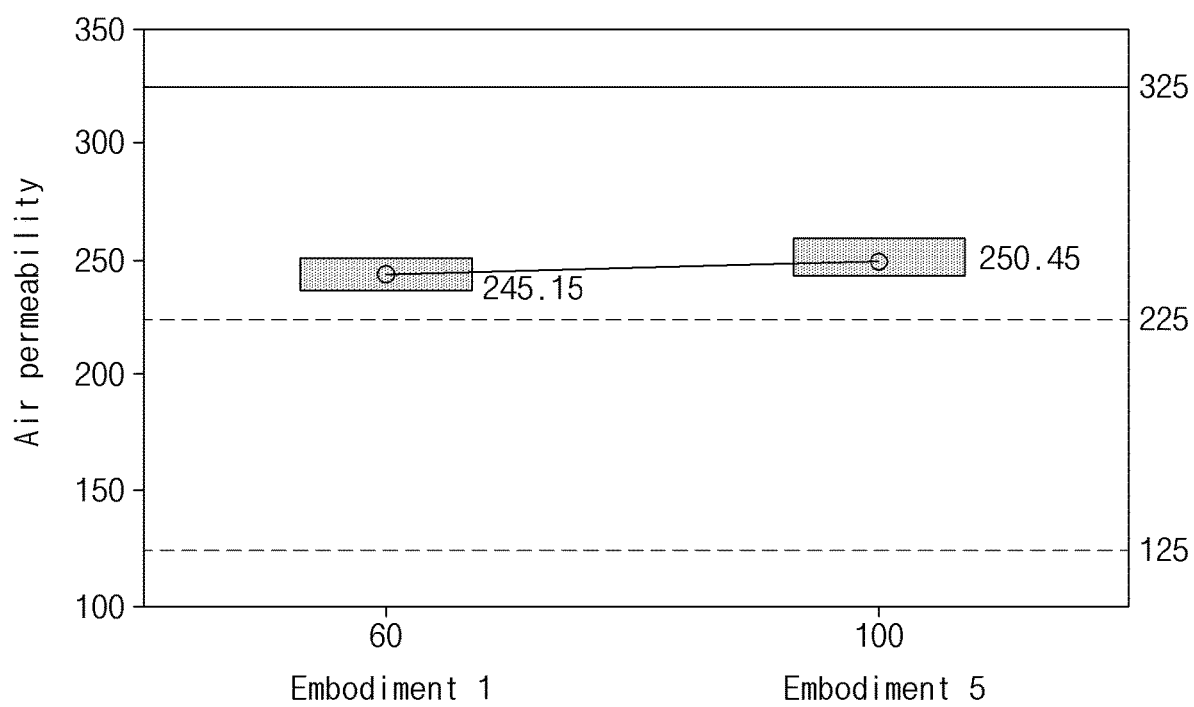

Air permeability of each of the secondary batteries prepared according to Embodiments 1 and 5 was measured. The results obtained by measuring the air permeability of each of the secondary batteries manufactured according to Embodiments 1 to 4 were illustrated in FIG. 10, and the results obtained by measuring the air permeability of each of the secondary batteries manufactured according to Embodiments 1 and 5 were illustrated in FIG. 11. The air permeability was measured by calculating a time (seconds) that is taken to allow 100 ml of air to pass through the secondary battery.

In Experimental Examples 1 and 2, the following results may be derived.

It is seen that as the pressure applied to the electrode assembly in the first pressing step increases, the curvature radius of the secondary battery tends to decrease. That is, it is seen that as the pressure applied to the electrode assembly in the first pressing step increases, the shape of the curved surface formed on the secondary battery is well maintained. However, when the pressure is 1,000 kgf (Embodiment 3) and 1,500 kgf (Embodiment 4), it is seen that a difference in curvature radius of the curved surface formed on the secondary battery is not large.

On the other hand, it is seen that as the pressure applied to the electrode assembly in the first pressing step increases, the air permeability of the secondary battery increases. That is, is seen that as the pressure applied to the electrode assembly in the first pressing step increases, performance of the secondary battery is deteriorated. Particularly, it is seen that the air permeability rapidly increases when the pressure is 1,500 kgf (Embodiment 4) when compared to the case in which the pressure is 1,000 kgf (Embodiment 3).

When comparing Embodiment 1 to Embodiment 5, it is seen that the curvature radius of the secondary battery in the case in which the pressing time in the first pressing step is 60 seconds (i.e., Embodiment 1) is significantly larger than the curvature radius of the secondary battery in the case in which the pressing time in the first pressing is 100 seconds (i.e., Embodiment 5). On the other hand, it is seen that the air permeability of the secondary battery in the case in which the pressing time in the first pressing step is 100 seconds (i.e., Embodiment 5) is no significant difference from the air permeability of the secondary battery in the case in which the pressing time in the first pressing step is 60 seconds (i.e., Embodiment 1) (i.e., it is seen that the air permeability in both Embodiments 1 and 5 is about 250 seconds.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

1: Secondary battery
10: Electrode assembly
110: First radical unit
120: Second radical unit
130: Third radical unit
142: Negative electrode
144: Positive electrode
144': Single-sided positive electrode
146: Separator
150: Separation film
20: Roller
C: Curved surface

The invention claimed is:
1. A method for manufacturing a secondary battery, the method comprising:
an electrode assembly preparation step of preparing an electrode assembly which has a structure, in which electrodes and separators are alternately disposed, and on which flat top and bottom surfaces are formed;

a first pressing step of pressing the top and bottom surfaces of the electrode assembly by using a first pressing device, on which first and second curved surfaces are formed, to form third and fourth curved surfaces, which have shapes corresponding to that of the first and second curved surfaces formed on the first pressing device, on the top and bottom surfaces of the electrode assembly, respectively;

an accommodation step of accommodating the electrode assembly, on which the third and fourth curved surfaces on the top and bottom surfaces of the electrode assembly are formed, in a pouch type exterior in which a cup having a concave shape is formed; and a second pressing step of pressing the third and fourth curved surfaces of the top and bottom surfaces of the electrode assembly and an outer surface of the pouch type exterior by using a second pressing device on which fifth and sixth curved surfaces are formed, wherein a pressure of pressing the electrode assembly in the first pressing step is higher than a pressure of pressing the electrode assembly and the pouch type exterior in the second pressing step.

2. The method of claim 1, further comprising a cup formation step which is performed before the accommodation step and in which the cup, in which seventh and eighth curved surfaces having shapes corresponding to that of the third and fourth curved surfaces formed on the top and bottom surfaces of the electrode assembly in the first pressing step are formed, are formed in the pouch type exterior.

3. The method of claim 1, further comprising a surface leveling step which is performed after the second pressing step and in which ninth and tenth curved surfaces formed on the pouch type exterior, which are formed in the second pressing step, are leveled.

4. The method of claim 3, wherein, in the surface leveling step, a roller having a cylindrical shape rotates on the ninth and tenth curved surfaces formed on the pouch type exterior to improve evenness of the ninth and tenth curved surfaces formed on the pouch type exterior.

5. The method of claim 1, wherein the electrode assembly has a lamination & stacking (L&S) structure in which the electrodes and the separators are alternately stacked in a thickness direction of the electrode assembly or a stacking & folding (S&F) structure in which a plurality of radical units comprising the electrodes are disposed on a rectangular separation film, and the separation film is folded to provide the separators.

6. The method of claim 1, wherein, in the electrode assembly preparation step, a pressure of pressing the electrode assembly ranges from 180 kgf to 220 kgf, and a temperature of heating the electrode assembly ranges from 40° C. to 70° C.

7. The method of claim 1, wherein, in the first pressing step, the pressure of pressing the electrode assembly ranges from 600 kgf to 3000 kgf, a temperature of heating the electrode assembly ranges from 60° C. to 85° C., and a time taken to press and heat the electrode assembly ranges from 20 seconds to 110 seconds.

8. The method of claim 7, wherein, in the first pressing step, the pressure of pressing the electrode assembly ranges from 950 kgf to 3,000 kgf, and the time taken to press and heat the electrode assembly ranges from 20 seconds to 65 seconds.

9. The method of claim 7, wherein, in the first pressing step, the pressure of pressing the electrode assembly ranges from 900 kgf to 2,600 kgf, and the time taken to press and heat the electrode assembly ranges from 20 seconds to 65 seconds.

10. The method of claim 1, wherein, in the second pressing step, the pressure of pressing the electrode assembly and the pouch type exterior ranges from 200 kgf to 750 kgf, and a temperature of heating the electrode assembly and the pouch type exterior ranges from 55° C. to 85° C.

11. The method of claim 1, further comprising a third pressing step of additionally pressing the third and fourth curved surfaces formed on the top and bottom surfaces of the electrode assembly and ninth and tenth curved surfaces formed on the pouch type exterior, which are formed in the second pressing step, by using a third pressing device on which eleventh and twelfth curved surfaces are formed.

12. The method of claim 11, wherein, in the third pressing step, a pressure of pressing the electrode assembly and the pouch type exterior ranges from 300 kgf to 700 kgf, a temperature of heating the electrode assembly and the pouch type exterior ranges from 75° C. to 85° C., and a time taken to press and heat the electrode assembly and the pouch type exterior ranges from 3 seconds to 12 seconds.

13. The method of claim 11, wherein, after the third pressing step, a curvature radius of the third and fourth curved surfaces of the electrode assembly and the ninth and tenth curved surfaces of the pouch type exterior ranges from 70 mm to 150 mm.

14. The method of claim 13, wherein, after the third pressing step, the curvature radius of the third and fourth curved surfaces of the electrode assembly and the ninth and tenth curved surfaces of the pouch type exterior ranges from 80 mm to 100 mm.

* * * * *